(12) United States Patent
Li

(10) Patent No.: US 11,719,886 B1
(45) Date of Patent: Aug. 8, 2023

(54) ACHROMATIC POLARIZATION VOLUME GRATING, OPTICAL WAVEGUIDE SYSTEM AND ELECTRONIC DEVICE

(71) Applicant: Goertek Inc., Shandong (CN)

(72) Inventor: Lingshan Li, San Jose, CA (US)

(73) Assignee: Goertek Inc., Shandong (CN)

( * ) Notice: Subject to any disclaimer, the term of this patent is extended or adjusted under 35 U.S.C. 154(b) by 0 days.

(21) Appl. No.: 17/666,731

(22) Filed: Feb. 8, 2022

(51) Int. Cl.
*G02B 6/34* (2006.01)
*G02B 5/18* (2006.01)
*G02B 5/30* (2006.01)

(52) U.S. Cl.
CPC ............. *G02B 6/34* (2013.01); *G02B 5/1866* (2013.01); *G02B 5/3016* (2013.01)

(58) Field of Classification Search
CPC ....... G02B 6/34; G02B 5/1866; G02B 5/3016
See application file for complete search history.

(56) References Cited

U.S. PATENT DOCUMENTS

| 11,175,441 | B1* | 11/2021 | Tabirian | G02B 5/3025 |
| 2021/0033770 | A1* | 2/2021 | Lu | G03H 1/04 |
| 2021/0349326 | A1* | 11/2021 | Peng | G02B 27/425 |
| 2021/0389513 | A1* | 12/2021 | Wang | G02B 5/3016 |

OTHER PUBLICATIONS

"Nanoscale liquid crystal polymer Bragg polarization gratings" by Xiang X, Kim J, Komanduri R, Escuti MJ in Opt Express. 2017;25(16):19298. doi:10.1364/OE.25.019298.

"Bragg polarization gratings for wide angular bandwidth and high efficiency at steep deflection angles" by Xiang X, Kim J, Escuti MJ in Sci Rep. 2018;8(1):7202. doi:10.1038/s41598-018-25535-0.

(Continued)

*Primary Examiner* — Ellen E Kim
(74) *Attorney, Agent, or Firm* — Baker Botts LLP

(57) ABSTRACT

A polarization volume grating, an optical waveguide system and an electronic device are disclosed. Parameters of the polarization volume grating satisfy with those derived by performing a multivariable optimization algorithm on a merit function of $f_k(d_1,\phi_1,d_2,\phi_2,\ldots,d_m,\phi_m,d)=[1-n_1(\theta,\psi)]^2$, wherein the parameters include $d_1,\phi_1,d_2,\phi_2,\ldots,d_m,\phi_m$, where $m=1,2,3,\ldots$, and d, m is the number of layers of the polarization volume grating, $d_m$ is a thickness of mth layer, $\phi_m$ is a twist angle in mth layer, and d is a period of the polarization volume grating, k represents a central wavelength on which the multivariable optimization algorithm is performed, $\theta$ represents a polar angle of an incident light, $\psi$ represents an azimuth angle of the incident light, and $n_1(\theta,\psi)$ represents a first-order diffraction efficiency of the polarization volume grating.

7 Claims, 7 Drawing Sheets

(56) References Cited

OTHER PUBLICATIONS

"Reflective polarization volume gratings for high efficiency waveguide-coupling augmented reality displays" by Lee Y-H, Yin K, Wu S-T in Opt Express. 2017;25(22):27008. doi:10.1364/OE.25.027008.
"Polarization volume gratings for near-eye displays and novel photonic devices" by Yin K, Zhan T, Xiong J, He Z, Wu S-T in Crystals. 2020;10(7):561.
"Chirped polarization volume grating with ultra-wide angular bandwidth and high efficiency for see-through near-eye displays" by Yin K, Lin H-Y, Wu S-T in Opt Express. 2019;27(24):35895. doi:10.1364/oe.27.035895.

\* cited by examiner

ACHROMATIC POLARIZATION VOLUME GRATING, OPTICAL WAVEGUIDE SYSTEM AND ELECTRONIC DEVICE

FIELD OF THE INVENTION

This disclosure relates to the technical field of polarization volume grating, and more specifically, to a polarization volume grating, an optical waveguide system and an electronic device.

BACKGROUND OF THE INVENTION

In an electronic device such as a near-eye displays (NED) system, the lights/rays emerged from a displays such as a laser-beam scanner (LBS) displays, a micro-LED displays, or a liquid crystal on silicon (LCOS) displays, are in-coupled to a waveguide by gratings responsive to the input wavelength of lights, undergoes total internal reflection, and finally is out-coupled to the air using gratings. Two main types of strategies that includes the input coupler grating (ICG) and the output couplers grating (OCG) had been proposed. One of them is surface-relief-grating (SRG) based waveguide (WG) system. The SRG scheme can operate with both polarized and unpolarized light source. The SRG scheme has some unavoidable problem, such as high diffraction differentiation between different polarizations, and back-coupling on the ICG. Besides, the SRG scheme has a high-manufacturing cost. The other one is a liquid crystal (LC) grating based WG employing the polarization volume grating (PVG).

The article of "Nanoscale liquid crystal polymer Bragg polarization gratings" by Xiang X, Kim J, Komanduri R, Escuti MJ in Opt Express. 2017;25(16);19298. doi:10.1364/OE.25.019298 discloses nanoscale liquid crystal polymer Bragg polarization gratings, which is hereby incorporated in its whole by reference.

The article of "Bragg polarization gratings for wide angular bandwidth and high efficiency at steep deflection angles" by Xiang X, Kim J, Escuti MJ in Sci Rep. 2018;8(1):7202. doi:10.1038/s41598-018-25535-0 discloses Bragg polarization gratings, which is hereby incorporated in its whole by reference.

The article of "Reflective polarization volume gratings for high efficiency waveguide-coupling augmented reality displays" by Lee Y-H, Yin K, Wu S-T in Opt Express. 7017; 25(77):27008, doi:10,1364/OE.25,027008 discloses reflective polarization volume gratings, which is hereby incorporated in its whole by reference.

The article of "Polarization volume gratings for near-eye displays and novel photonic devices" by Yin K, Zhan T, Xiong J, He Z, Wu S-T in Crystals. 2020;10(7):561 discloses polarization volume gratings, which is hereby incorporated in its whole by reference.

The article of "Chirped polarization volume grating with ultra-wide angular bandwidth and high efficiency for see-through near-eye displays" by Yin K, Lin H-Y, Wu S-T in Opt Express. 2019;27(24):35895. doi:10.1364/OE.27.035895 discloses a chirped polarization volume grating, which is hereby incorporated in its whole by reference.

SUMMARY OF THE INVENTION

One object of this disclosure is to provide a new technical solution for a polarization volume grating.

According to a first aspect of the present disclosure, there is provided a polarization volume grating (PVG), wherein parameters of the polarization volume grating satisfy with those derived by performing a multivariable optimization algorithm on a merit function as below:

$$f_k(d_1,\phi_1,d_2,\phi_2,\ldots,d_m,\phi_m,d)=[1-n_1(\theta,\psi)]^2 \quad (1)$$

wherein the parameters include $d_1,\phi_1,d_2,\phi_2,\ldots,d_m,\phi_m$, where m=1,2,3, . . . , and d, wherein m is the number of layers of the polarization volume grating $d_m$ is a thickness of mth layer, $\phi_m$ is a twist angle in mth layer, and d is a period of the polarization volume grating, wherein k represents a central wavelength on which the multivariable optimization algorithm is performed, θ represents a polar angle of an incident light, ψ represents an azimuth angle of the incident light, and $n_1(\theta,\psi)$ represents a first-order diffraction efficiency of the polarization volume grating.

According to a second aspect of the present disclosure, there is provided an optical waveguide system, comprising: a waveguide; an input coupler grating, provided at input side of the waveguide and coupling a light into the waveguide; and an output coupler grating, provided at output side of the wave-guide and coupling the light out of the waveguide, wherein at least one of the input coupler grating and the output coupler grating is the polarization volume grating according to an embodiment.

According to a second aspect of the present disclosure, there is provided an electronic device, comprising: a displays, which generates an image light; and an optical waveguide system as above, which receives the image light.

According to an embodiment of this disclosure, a performance of a polarization volume grating may be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the invention.

DETAILED DESCRIPTION OF THE EMBODIMENTS

Figure 1:
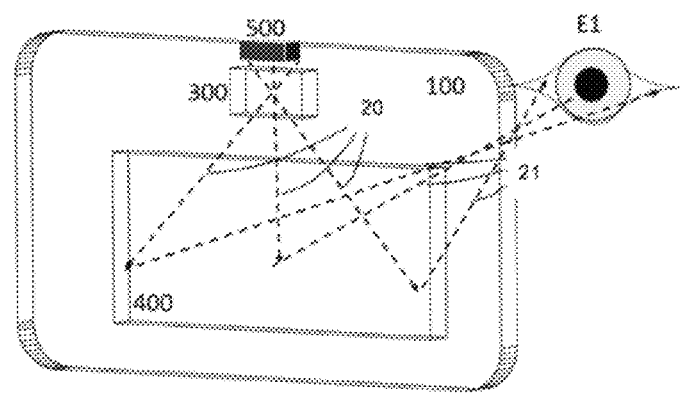
FIG. 1 shows an electronic device adopting an optical waveguide system according to an embodiment.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Here, several polarization volume gratings (PVGs) are proposed. The polarization volume gratings can be based on liquid crystal and can be used in a near-eye displays optical waveguide system. The polarization volume gratings can be used as input coupler gratings and/or output coupler gratings, for example, in a near-eye display system.

FIG. 1 shows an electronic device adopting an optical waveguide system according to an embodiment. The electronic device may be a near-eye displays system. As shown in FIG. 1, image light with a certain FOV is emerged from a light source or displays 500 and is diffracted by an input coupler grating 300 to become lights 20. Lights 20 travel in a waveguide 100 and then are diffracted by an output coupler grating 400 to become lights 21. Lights 21 finally enter a human eye. The input coupler grating 300 and/or output coupler grating 400 can be a polarization volume grating, such as an LC-based transmissive polarization volume grating.

It is very difficult for a polarization volume grating to enable diffraction for lights within visible wavelengths and with all angles within FOV, with a single monolithic polarization volume grating.

Figure 2:
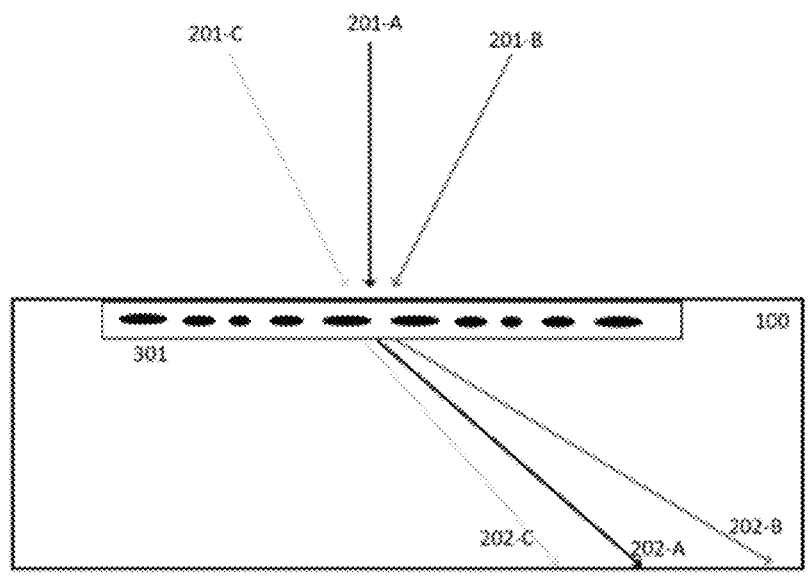
FIG. 2 shows a prior art polarization volume grating.

FIG. 2 shows a prior art polarization volume grating. In FIG. 2, the ray bundle 201 including 201-A, 201-B, 201-C represents a light of a certain wavelength (for example green light) with different incident angles. The chromatic ray bundle 201 is then diffracted by a polarization volume grating 301 within a waveguide 100, resulting a ray bundle 202 including 202-A, 202-B, 202-C. In the optical waveguide system, further polarization volume gratings shall be needed to efficiently handle other lights such as red light and blue light. This will increase the form factor of the system.

In various embodiment, a type of monolithic polarization volume grating with more than one layer is proposed. Parameters of the polarization volume grating satisfy with those derived by performing a multivariabie optimization algorithm on a merit function as below:

$$f_k(d_1,\phi_1,d_2,\phi_2,\ldots,d_m,\phi_m,d)=[1-n_1(\theta,\psi)]^2 \quad (1)$$

In the merit function, the parameters include $d_1,\phi_1$, $d_2,\phi_2,\ldots,d_m,\phi_m$, where m= 1, 2, 3, ..., and d. m is the number of layers of the polarization volume grating, $d_m$ is a thickness of mth layer, $\phi_m$ is a twist angle in mth layer; and d is a period of the polarization volume grating.

The parameter k represents a central wavelength on which the multivariable optimization algorithm is performed. For example, k=r,g,b, which is corresponding to central wavelength $\lambda_c$=450 nm, 530 nm, 630 nm, i.e. red light, green light and blue light.

θ represents a polar angle of an incident light, ψ represents an azimuth angle of the incident light, and $n_1(\theta,\psi)$ represents the first order diffraction efficiency of the polarization volume grating.

The polarization volume gratings in various embodiment are monolithic.

Figure 3:
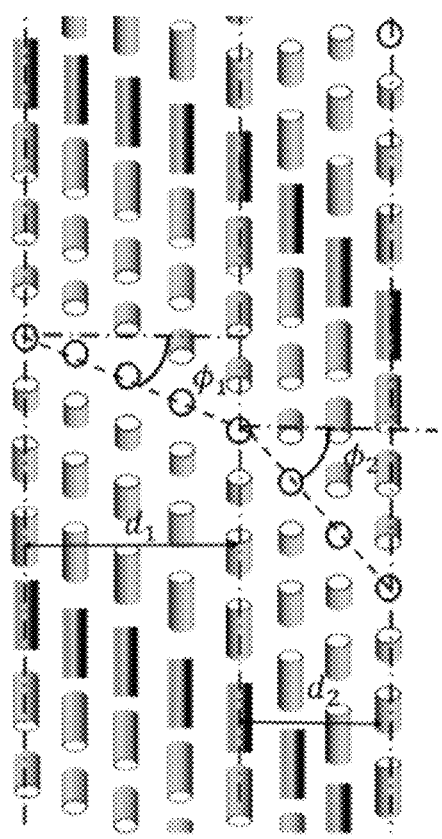
FIG. 3 shows a structure of a LC based polarization volume grating according to an embodiment.

The polarization volume grating is made by liquid crystal. FIG. 3 shows a structure of a LC based polarization volume grating according to an embodiment.

FIG. 3 shows a structure of a LC based polarization volume grating according to an embodiment. In FIG. 3, the number m of layers of the polarization volume grating is 2. $\phi_1$ is a twist angle in the first layer and $d_1$ is a thickness of the first layer. $\phi_2$ is a twist angle in the second layer and $d_2$ is a thickness of the second layer. In view of a balance of the complexity of a polarization volume grating and the performance thereof, a polarization volume grating with two layer is suitable for current near-eye displays. Here the merit function may be re-written as below:

$$f_k(d_1,\phi_1,d_2,\phi_2,d)=[1-n_1(\theta,\psi)]^2 \quad (1)$$

In FIG. 3, each layer has its own independent twist angle $\phi_1,\phi_2$ and thickness $d_1,d_2$. The twist angle is created by chiral LC molecules mixed with non-chiral LC molecules. The ratio of the chiral and non-chiral molecule mass determines the twist rate, which creates the twist angle within certain thickness. Light with circular polarization enter the polarization volume grating, and undergoes Bragg reflection.

For example, the polarization volume grating may be achromatic, which means the polarization volume grating can handle light of red green and blue simultaneously. In some scenario, the polarization volume grating can be designed on purpose to just handle any two of these three colors.

By using the solution as above, various desirable polarization volume gratings can be obtained. Below, several polarization volume gratings obtained as such will be described with reference to FIG. 4 to FIG. 13.

In various embodiment, two normal type of field of view FOV of ±15° (small FOV) and ±30° (large FOV) are adopted.

Figure 4:
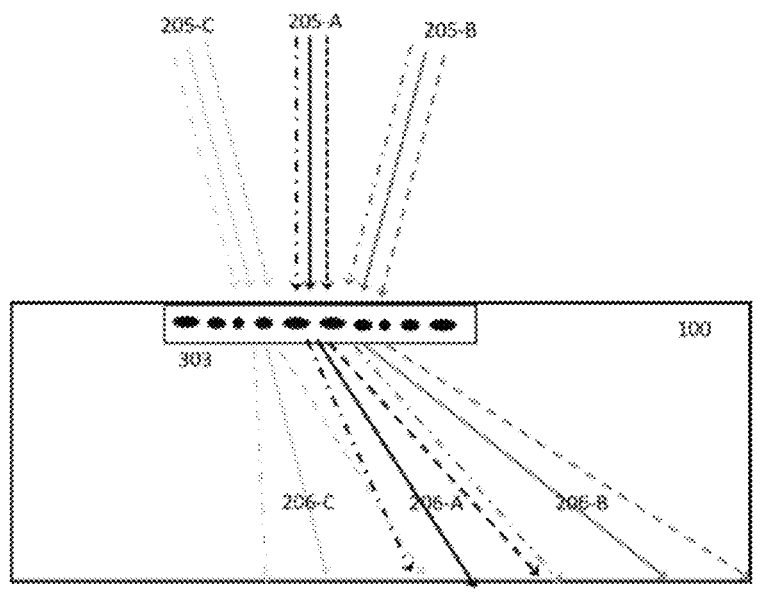
FIG. 4 shows a polarization volume grating according to an embodiment.

The polarization volume grating 303 shown in FIG. 4 has the small FOV. Light bundle 205 including 205-A, 205-B, 205-C from various incident angles and of different wavelengths are in-coupled by the polarization volume grating 303 into a waveguide 100 and become light bundle 206 including 206-A, 206-B, 206-C. The polarization volume grating, 303 can achieve a diffraction efficiency up to average 82.7% for RGB light.

Figure 5:
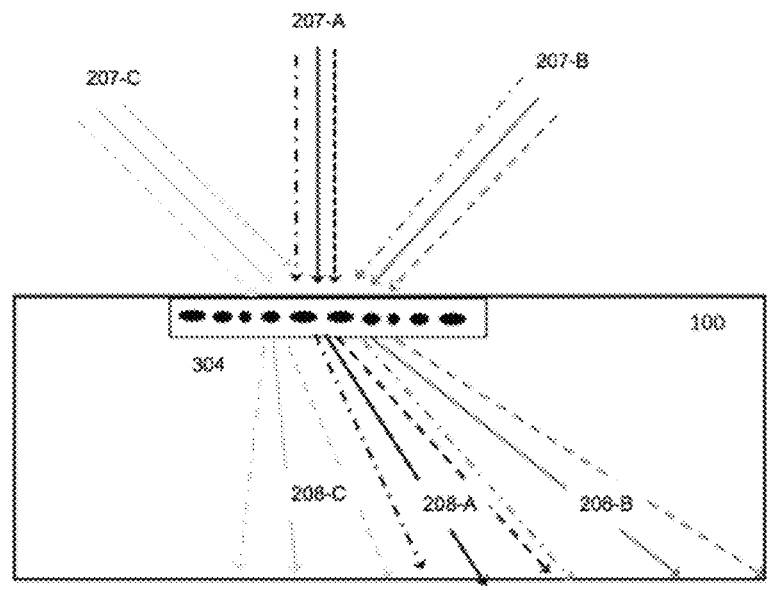
FIG. 5 shows a polarization volume grating according to another embodiment.

The polarization volume grating 304 shown in FIG. 5 has the large FOV. Light bundle 207 including 207-A, 207-B, 207-C front various incident angles and of different wavelength are in-coupled by the polarization volume grating 304 into a waveguide 100 and become light bundle 208 including 208-A, 208-B, 208-C. The polarization volume grating 304 can achieve a diffraction efficiency up to average 93.3% for RGB lights.

Figure 6:
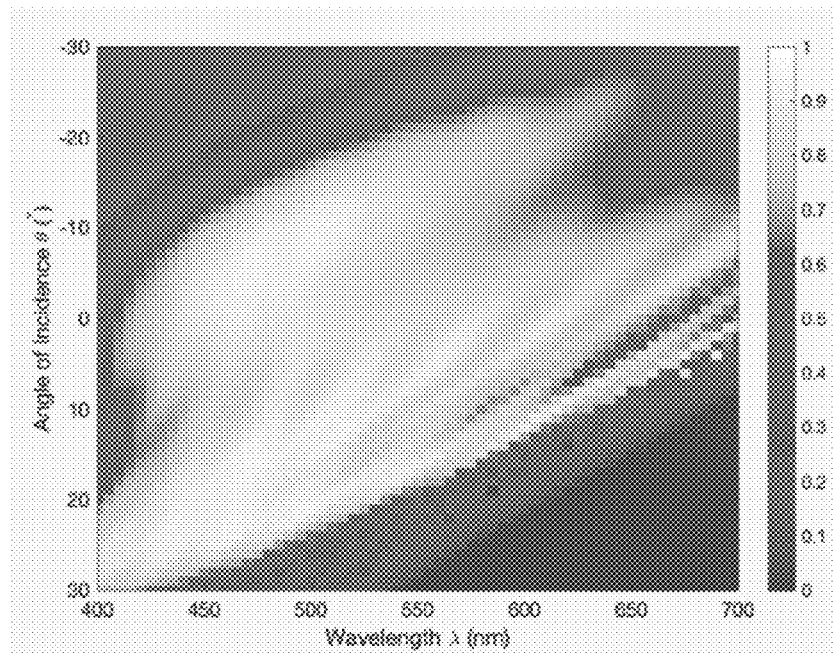
FIG. 6 shows a graph of diffraction efficiency of a polarization volume grating according to an embodiment.
Figure 7:
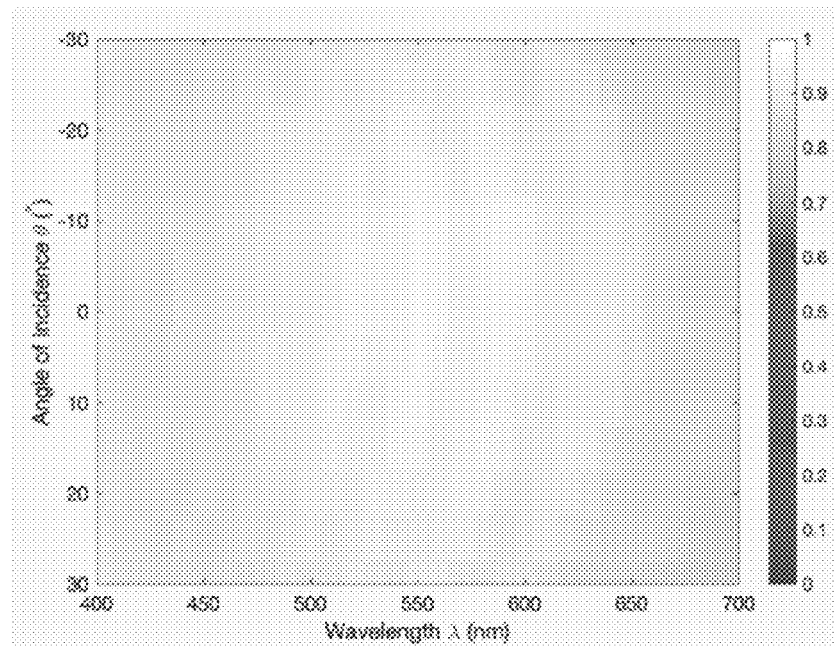
FIG. 7 shows a graph of diffraction efficiency of a polarization volume grating according to another embodiment.

The diffraction efficiencies (DE) of the polarization volume gratings 303 and 304 are shown in FIG. 6 and FIG. 7, respectively. The large diffraction efficiencies in the graphs in FIG. 6 and. FIG. 7 shows that the polarization volume gratings 303 and 304 have a color and brightness uniformity for small FOV and large FOV, respectively.

Polarization volume gratings with un-symmetric FOV can also be obtained in embodiments. For example, electrically-driven LC can be used to implement time-multiplexing polarization volume gratings to create a rendering image with better color and brightness uniformity. The polarization volume gratings with un-symmetric FOV can be used to compensate a intensity loss when light transmitting inside a waveguide system. It can be used as an output coupler grating.

Figure 8:
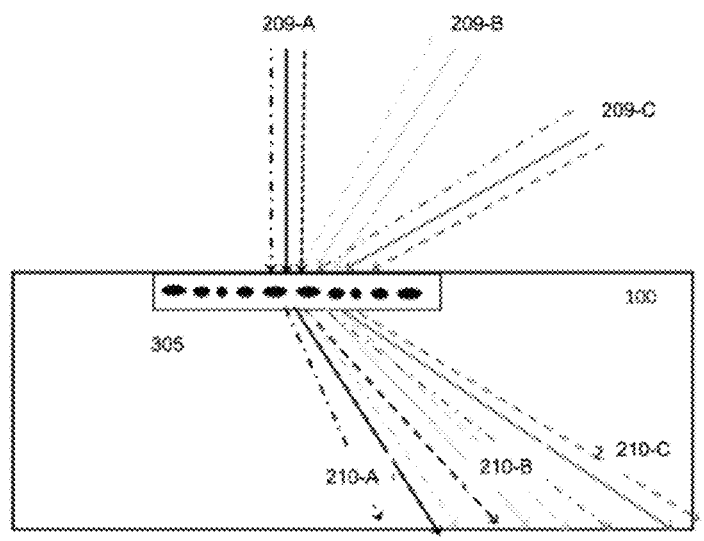
FIG. 8 shows a polarization volume grating according to another embodiment.
Figure 9:
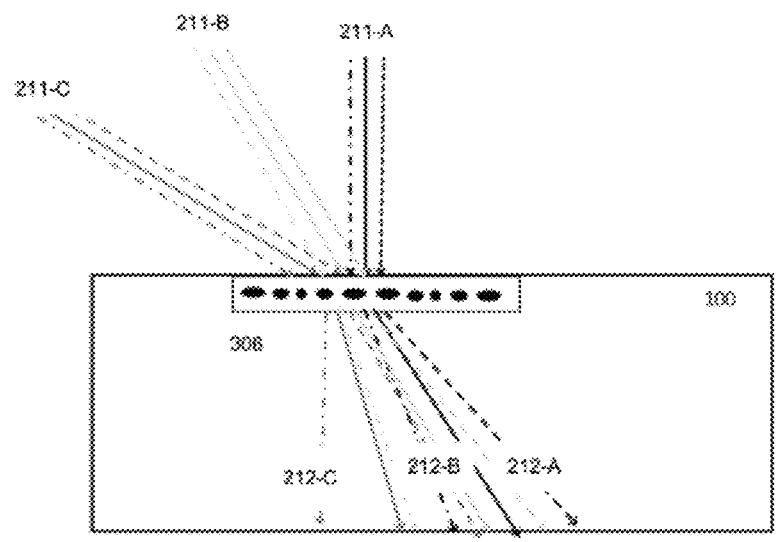
FIG. 9 shows a polarization volume grating according to another embodiment.

FIG. 8 and FIG. 9 shows two un-symmetric polarization volume gratings 305, 306.

The polarization volume grating 305 shown in FIG. 8 has an un-symmetric FOV of (−10° 30°) for RGB lights. Light bundle 209 including 209-A, 209-B, 209-C from various incident angles and of different wavelengths are in-coupled by the polarization volume grating 305 into a waveguide 100 and become light bundle 210 including 210-A, 210-B, 210-C.

The polarization volume grating 306 shown in FIG. 9 has an un-symmetric FOV of (−30° 10°) for RGB lights. Light bundle 211 including 211-A, 211-B, 211-C from various incident angles and of different wavelength are in-coupled by the polarization volume grating 305 into a waveguide 100 and become light bundle 212 including 212-A, 212-B, 212-C.

Figure 10:
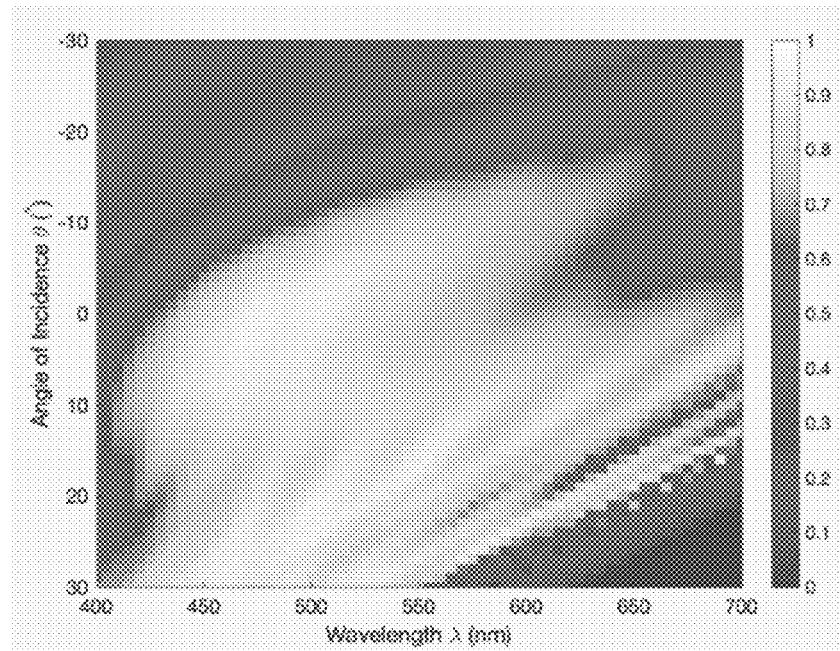
FIG. 10 shows a graph of diffraction efficiency of a polarization volume grating according to another embodiment.
Figure 11:
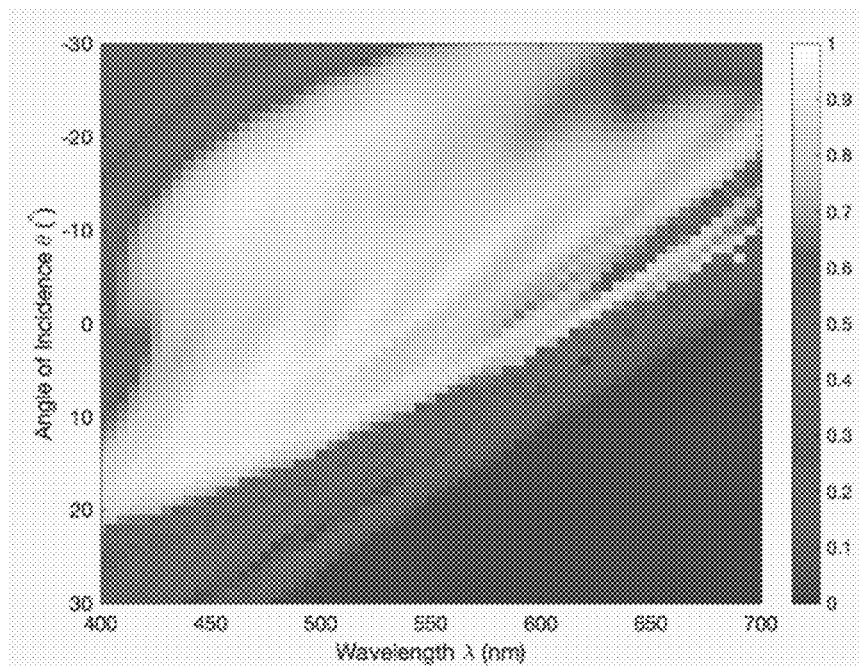
FIG. 11 shows a graph of diffraction efficiency of a polarization volume grating according to another embodiment.

FIG. 10 shows a graph of the diffraction efficiency of the polarization volume grating 305 and FIG. 11 shows a graph of the diffraction efficiency of the polarization volume grating 306. From FIG. 10 and FIG. 11, the diffraction efficiency shift from symmetric angular window to (−10° 30°) and (−30° 10°), respectively. As can be seen from FIG. 10 and FIG. 11, the polarization volume gratings 305 and 306 still maintain high-efficiency in the central wavelength. This can maintain the image brightness of certain FOVs. For example, the un-symmetric polarization volume gratings can be used to strengthen an oblique angle performance because the highest diffraction efficiency plateau has shifted from the center view.

Figure 12:
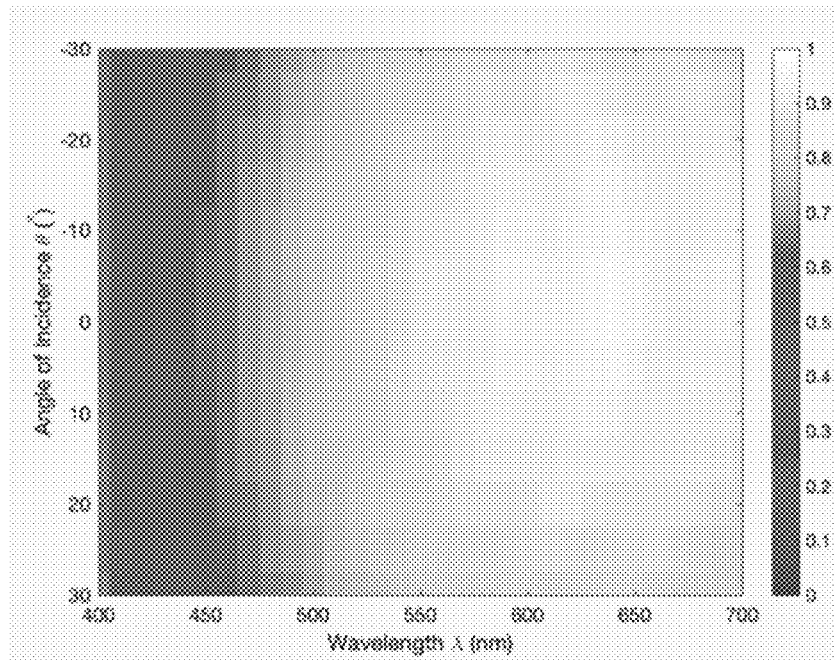
FIG. 12 shows a graph of diffraction efficiency of a polarization volume grating according to another embodiment.
Figure 13:
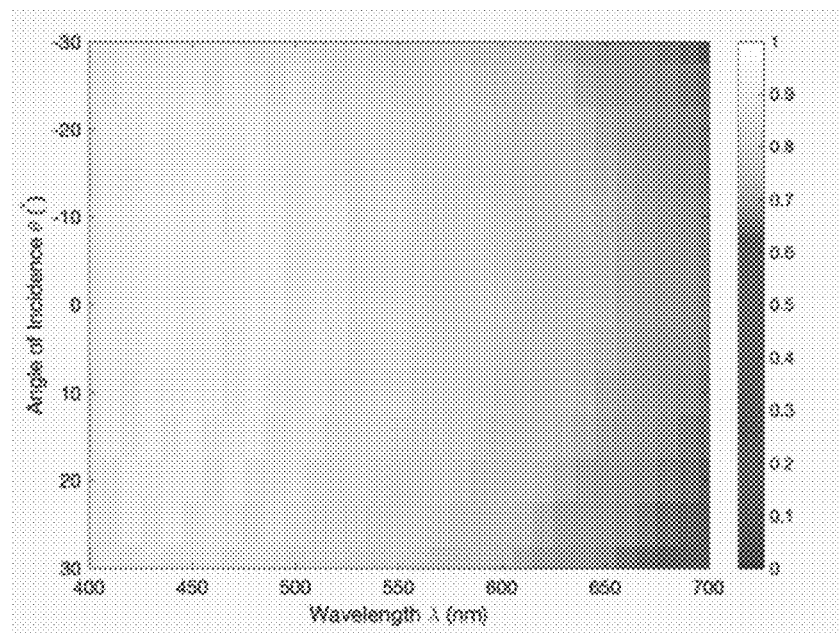
FIG. 13 shows a graph of diffraction efficiency of a polarization volume grating according to another embodiment.

In addition, a polarization volume grating with modulation on wavelength can also be implemented. The diffraction efficiency contour for such a polarization volume grating is varied by wavelength and angle, as shown in FIG. 12 and FIG. 13. Through a certain variable control, the two-layer chromatic polarization volume grating is able to be modulated with slow or fast change through RGB. For comparison and description reference, the chromatic polarization volume gating for green and red is named as element 306 and the chromatic polarization volume grating for blue and green is named as element 307.

In table 1, the summary of all designed polarization volume gratings is listed.

TABLE 1

| | Period (μm) | Twist rate (°/μm) | Wavelength | Thickness (μm) | Layer | FOV | Average Efficiency (%) |
|---|---|---|---|---|---|---|---|
| 303 | 0.4 | (100, 300) | RGB | 1.8 | 2 | (−15°, 15°) Symmetric | 82.7 |
| 304 | 6.5 | (−60, 60) | RGB | 2.4 | 2 | (−30°, 30°) Symmetric | 93.3 |
| 305 | 0.65 | (100, 300) | RGB | 1.8 | 2 | (−10° 30°) Un-symmetric | 86.2 |
| 306 | 0.45 | (100, 300) | RGB | 1.8 | 2 | (−30°, 10°) Un-symmetric | 84.1 |
| 307 | 1.2 | (−40, 40) | RG | 2.4 | 2 | (−30°, 30°) Symmetric | 88.1 |
| 308 | 1.2 | (−80, 80) | GB | 2.4 | 2 | (−30°, 30°) Symmetric | 89.3 |

It shall be understood by a person skilled in the art, the parameters of period, twist rate, wavelength, thickness and layers could be derived from the parameters including $d_1, \phi_1, d_2, \phi_2, \ldots, d_m, \phi_m$, where m=1,2,3 . . . , and d, described as above.

As discussed above, the polarization volume grating defined with the parameters described above could achieve an improved performance. For example, it can have a good diffraction efficiency for desired wavelength and within desired FOV with single monolithic polarization volume grating. That is, the monolithic polarization volume grating defined with the parameters described above could achieve a high efficiency with large operation wavelength expanded from violet to red and large operation angle wide field of view.

The polarization volume grating defined as such can be used as an input coupler grating and/or an output coupler grating in an optical waveguide system of a near-eye displays.

Figure 14:
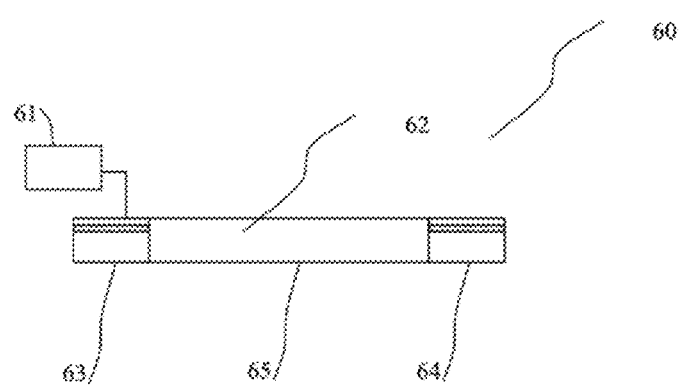
FIG. 14 shows a schematic block diagram of an electronic device according to an embodiment.

FIG. 14 shows a schematic block diagram of an electronic device according to an embodiment.

In FIG. 14, the electronic device 60 comprises a displays 61 and an optical waveguide system 62. The displays 61 generates an image light.

The optical waveguide system 62 includes an input coupler 63, a waveguide 65 and an output coupler 64 as described above. The input coupler grating 63 is provided at input side of the is waveguide 65 and couples the image light into the waveguide 65. The output coupler grating 64 is provided at output side of the waveguide 65 and couples the image light out of the waveguide 65. At least one of the input coupler grating 63 and the output coupler grating 64 is the polarization volume grating as described above.

Figure 15:
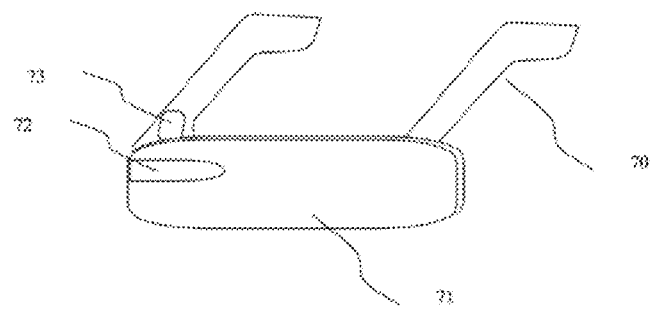
FIG. 15 shows an example of an electronic device.

FIG. 15 shows an example of an electronic device according to an embodiment. In FIG. 15, the electronic device 71 may be a near-eye displays such as an AR glass. The electronic device 71 may include a displays 73 and an optical displays system 72. The optical displays system 72 may be the optical waveguide system 62.

Although some specific embodiments of the present invention have been demonstrated in detail with examples, it should be understood by a person skilled in the art that the above examples are only intended to be illustrative but not to limit the scope of the present disclosure.

What is claimed is:

1. A polarization volume grating, having parameters derived by performing a multivariable optimization algorithm on a merit function:

$$f_k(d_1,\phi_1,d_2,\phi_2,\ldots,d_m,\phi_m,d)=[1-n_1(\theta,\psi)]^2 \quad (1)$$

wherein the parameters include $d_1,\phi_1,d_2,\phi_2,\ldots,d_m,\phi_m$, where m=1,2,3, ..., and d, wherein m is the number of layers of the polarization volume grating, $d_m$ is a thickness of an mth layer therein, $\phi_m$ is a twist angle in the mth layer, and d is a period of the polarization volume grating, wherein k represents a central wavelength on which the multivariable optimization algorithm is performed, $\theta$ represents a polar angle of an incident light, $\psi$ represents an azimuth angle of the incident light, and $n_1(\theta,\psi)$ represents a first-order diffraction efficiency of the polarization volume grating, wherein m=2, wherein period, twist rates of the two layers, wavelength and thickness of the polarization volume grating are selected from the following groups:

0.4 µm (100°/µm, 300°/µm), 450 nm/530 nm/630 nm, 1.8 µm;

6.5 µm, (−60°/µm, 60°/µm), 450 nm/530 nm/630 mm, 2.4 µm;

0.65 µm, (100°/µm, 300°/µm), 450 nm/530 nm /630 nm, 1.8 µm:

0.45 µm, (100°/µm, 300°/µm), 450 nm/530 nm/630 nm, 1.8 µm;

1.2 µm, (−40°/µm, 40°/µm), 450 nm/530 nm, 2.4 µm; and 1.2 µm, (−80°/µm, 80°/µm), 530 nm/630 nm, 2.4 µm.

2. The polarization volume grating according to claim 1, wherein the polarization volume grating comprises a liquid crystal.

3. The polarization volume grating according to claim 1, wherein the polarization volume grating is achromatic.

4. The polarization volume grating according to claim 1, wherein k = r,g,b corresponding central wavelengths $\lambda_c$=450 nm,530 nm,630 nm.

5. The polarization volume grating according to claim 1, wherein the polarization volume grating is used as an input coupler grating and/or an output coupler grating in an optical waveguide system of a near-eye display.

6. An optical waveguide system, comprising:

a waveguide;

an input coupler grating, provided at input side of the waveguide and coupling a light into the waveguide; and an output coupler grating, provided at output side of the waveguide and coupling the light out of the waveguide, wherein at least one of the input coupler grating and the output coupler grating is the polarization volume grating according to claim 1.

7. An electronic device, comprising:

a display, which generates an image light; and an optical waveguide system according to claim 6, which receives the image light.

* * * * *